(12) United States Patent
Piatek et al.

(10) Patent No.: US 11,157,645 B2
(45) Date of Patent: Oct. 26, 2021

(54) DATA MASKING WITH ISOMORPHIC FUNCTIONS

(71) Applicant: International Business Machines Corporation, Armonk, NY (US)

(72) Inventors: Monika Piatek, Cracow (PL); Michal Bodziony, Tęgoborze (PL); Marcin Filip, Cracow (PL); Andrzej Laskawiec, Cracow (PL); Marcin Luczynski, Cracow (PL); Lukasz S. Studzienny, Cracow (PL); Tomasz Zatorski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 16/177,810

(22) Filed: Nov. 1, 2018

(65) Prior Publication Data

US 2020/0143075 A1 May 7, 2020

(51) Int. Cl.
*G06F 21/62* (2013.01)
(52) U.S. Cl.
CPC ................ *G06F 21/6227* (2013.01)
(58) Field of Classification Search
CPC ............ G06F 21/6227; G06F 21/6254
USPC ............................................. 726/26
See application file for complete search history.

(56) References Cited

U.S. PATENT DOCUMENTS

| | | | |
|---|---|---|---|
| 5,907,512 A * | 5/1999 | Parkinson | G06F 11/1032 365/195 |
| 7,974,942 B2 * | 7/2011 | Pomroy | G06F 21/6245 707/610 |
| 8,306,932 B2 * | 11/2012 | Saxena | G06N 3/0427 706/42 |
| 9,171,182 B2 * | 10/2015 | Shukla | G06F 21/6254 |
| 9,946,810 B1 * | 4/2018 | Trepetin | H04L 9/008 |
| 2002/0016918 A1 * | 2/2002 | Tucker | G06F 21/14 713/190 |
| 2002/0168068 A1 * | 11/2002 | Nasu | H04N 5/913 380/201 |
| 2006/0195402 A1 * | 8/2006 | Malina | H04L 9/3226 705/50 |
| 2008/0247674 A1 * | 10/2008 | Walch | G06K 9/344 382/305 |
| 2008/0276087 A1 * | 11/2008 | Hasegawa | G05B 19/054 713/168 |
| 2009/0204631 A1 * | 8/2009 | Pomroy | G06F 21/6227 |

(Continued)

OTHER PUBLICATIONS

Mell, Peter et al.; "The NIST Definition of Cloud Computing;" National Institute of Standards and Technology; Special Publication 800-145; Sep. 2011; 7 pages.

(Continued)

*Primary Examiner* — Badri Narayanan Champakesan
(74) *Attorney, Agent, or Firm* — Schmeiser, Olsen & Watts, LLP; William Hartwell

(57) ABSTRACT

A method of masking data includes disabling, by one or more processors of a computer system, operation of a data structure that includes at least one data index. The method includes masking, by the one or more processors of the computer system, the data structure in a table with an isomorphic function, and enabling, by the one or more processors of the computer system, operation of the data structure.

18 Claims, 9 Drawing Sheets

(56) References Cited

U.S. PATENT DOCUMENTS

| | | | | |
|---|---|---|---|---|
| 2010/0189316 A1* | 7/2010 | Walch | G06K 9/0008 | 382/125 |
| 2010/0268719 A1* | 10/2010 | Cormode | G06F 21/6254 | 707/756 |
| 2011/0030064 A1* | 2/2011 | Kwak | G11C 7/1078 | 726/26 |
| 2011/0041184 A1* | 2/2011 | Cormode | G06F 21/6254 | 726/26 |
| 2011/0145593 A1* | 6/2011 | Auradkar | H04L 9/006 | 713/189 |
| 2011/0246548 A1* | 10/2011 | Yen | G06F 7/724 | 708/492 |
| 2013/0201748 A1* | 8/2013 | Chung | G11C 13/0059 | 365/100 |
| 2014/0095779 A1* | 4/2014 | Forsyth | G06F 9/3838 | 711/105 |
| 2014/0164405 A1* | 6/2014 | Tsai | G06F 21/6227 | 707/754 |
| 2015/0161397 A1* | 6/2015 | Cook | G06F 21/6254 | 726/26 |
| 2016/0063258 A1* | 3/2016 | Ackerly | H04L 63/0428 | 713/189 |
| 2017/0169133 A1* | 6/2017 | Kim | G06F 16/2237 | |
| 2019/0026332 A1* | 1/2019 | Ahmed | G06F 16/24537 | |
| 2019/0377895 A1* | 12/2019 | Sanghi | G06F 21/6245 | |
| 2020/0099510 A1* | 3/2020 | Mao | H04L 9/0618 | |
| 2020/0159629 A1* | 5/2020 | Zhang | G06F 11/1471 | |

OTHER PUBLICATIONS

Authors et al.: Disclosed Anonymously; Automated Discovery and Masking of Sensitive Data; IP.com Disclosure No. IPCOM000240280D; Publication Date: Jan. 21, 2015, 6 pages.

* cited by examiner

DATA MASKING WITH ISOMORPHIC FUNCTIONS

TECHNICAL FIELD

The present invention relates to systems and methods for data masking. More specifically, the invention relates to systems and methods for data masking with isomorphic functions.

BACKGROUND

Enterprises rely on privacy sensitive confidential data that needs to be protected. Production environments are typically highly protected by firewalls, encryptions or the like. However, other environments may be less secure such that sensitive data may become vulnerable to disclosure or potential data theft. Thus, data masking is often a mechanism to secure data in otherwise vulnerable environments. While data masking may increase security of data, even data masking has limitations.

For example, one approach for data masking includes using data generators to produce meaningless strings and replace real information with such meaningless strings. For example, "Joe Doe" may be replaced with "3ek bP0" by such a data masking approach. While this data is now encrypted, this solution may cause problems in self balancing trees or similar index structures. This is because the lexicographical order of the data in a tree may be changed in such index structures.

One method of attempting to overcome this problem is to perform the masking by creating a masked index structure, then delete and restore the original source database such that the restored data corresponds with the masked index structure. Another method of attempting to overcome this problem is to create an empty database, extract data from the original source database, perform data masking on the extracted data, and then load the masked data into the created empty database. However, these methods require time, processing and storage resources.

Thus, improved systems and methods of data masking that improve computer performance by requiring less time, processing and/or storage resources would be well received in the art.

SUMMARY

An embodiment of the present invention relates to a method, and associated computer system and computer program product, of masking data. One or more processors of a computer system disable operation of a data structure that includes at least one data index. The one or more processors of the computer system mask the data structure in a table with an isomorphic function. The one or more processors of the computer system enable operation of the data structure.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

The present invention improves and optimizes data masking and/or encryption systems. In particular, the present invention recognizes that prior art data masking systems require excessive time, processing and/or storage, particularly in the case of data masking self-balanced tree structures having data indexes. Systems and methods described herein provide for less time, processing and/or storage resources to accomplish data masking of data structures having self-balanced trees by not requiring the deletion or reconstruction of data indexes to preserve order and relationships between the masked data and the original data. The present systems and methods are configured to improve computer system performance by requiring less computer resources, including hardware, memory and processing resources. Further, the present systems and methods are configured to significantly improve computer system performance when performing data masking of data stored in self-balanced trees, such as B-trees, B+=trees, Red and Black trees, and the like.

Figure 1:
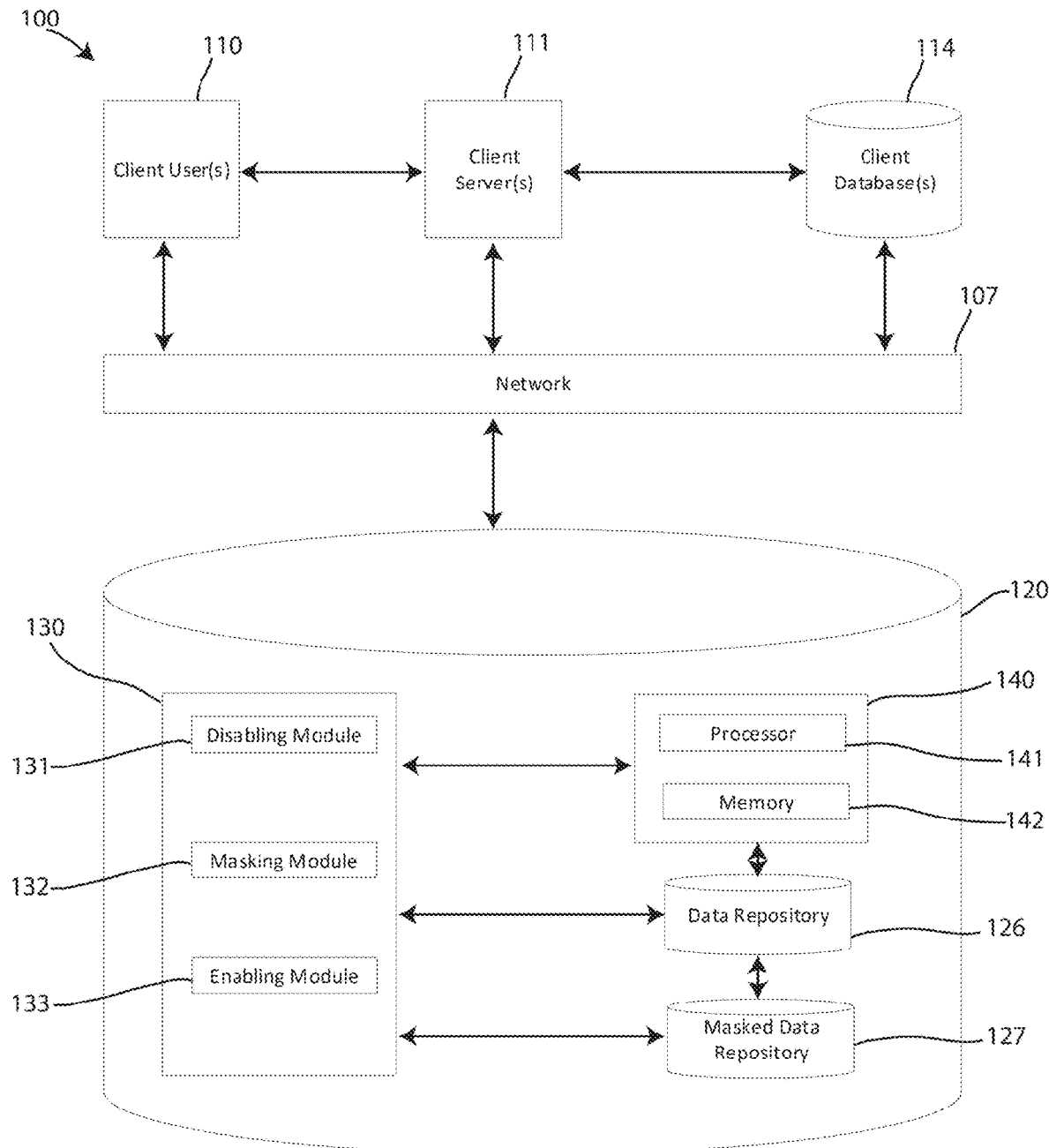
FIG. 1 depicts a block diagram of a system for masking data, in accordance with embodiments of the present invention.

Referring to the drawings, FIG. 1 depicts a block diagram of a system for data masking 100, in accordance with embodiments of the present invention. The system for data masking 100 may include one or more client users 110, one or more client servers 111 and one or more client databases 114 connected over a network 107 to a computer system 120. Some or all of the one or more client users 110, the one or more client servers 111, and the one or more client databases 114 may be interconnected to others of these devices. While FIG. 1 shows the sensing one or more client users 110, the one or more client servers 111, and the one or more client databases 114 directly connected to adjacent elements 110, 111, 114, any interconnection of elements 110, 111, 114 is contemplated. Further, while each of the elements 110, 111, 114 are shown as separate features of the system for data masking 100, in some embodiments one or more of the elements 110, 111, 114 may be combined or overlap.

The one or more client users 110 may represent user devices and/or client accounts being operated by users of the system for data masking 100. The one or more client users 110 may represent any device or devices that are capable of connecting to the system and operated by a user, such as personal computers, desktop computers, laptop computers, display devices, mobile communicators such as a mobile phone, tablets, wearable devices such as a watch, or any other device connectable to the network 107 and the computer system 120 that is owned and/or operated by a user and/or that a user may use to access or communicate with the other elements 111, 114, 107, 120 of the system for data masking 100. The one or more client users 110 may represent devices that are capable of displaying a user interface for interacting with the other elements 111, 114, 107, 120 of the system for data masking 100.

The one or more client users 110 may further represent client accounts, such as database administrator accounts, or the like. The client accounts may operate on computer devices of the system for data masking 100. The one or more client users 110 may represent any users related to a client entity of the data masking system 100, such as employees, clients, customers, consumers, or the like, of the one or more user clients 110. The one or more client users 110 may be any user that generates data intended to be stored by the one or more client users 110. Thus, it should be understood that the one or more client users 110 may represent both user accounts and/or the hardware or devices that the user accounts may connect to the system for data masking 100.

The one or more client servers 111 may be client servers configured to store client information generated by the one or more client users 110. The one or more client servers 111 may be connected to the one or more client users 110 through any network mechanism, including the network 107, or a local network. The one or more client servers 111 may utilize a database management system (DBMS) such as a relational database management system (RDBMS). The one or more client servers 111 may also represent a cloud based server system that includes a cloud based database management system for storing client information and/or data in the cloud. The one or more client servers 111 may be any type of server system configured to store client information and may include any management system for server and database management.

The one or more client databases 114 may represent individual databases stored within the one or more client servers 111. The one or more client databases 114 may be managed by a DBMS and/or RDBMS. The one or more client databases 114 may be one or more network repositories that may be a client data collection area within the one or more client servers 111. The one or more client databases 114 may back up and save some or all data transmitted back and forth by the one or more client users 110 and/or the one or more client servers 111. The one or more client databases 114 may be stored within the one or more client servers 111 that are located at a data center and may be configured to save and catalogue user data sent or received by the user devices 111. The one or more client databases 114 may use this data to generate original databases related to the information received.

Embodiments of the computer system 120 may represent a cloud based client server or data storage and management location. The computer system 120 may be connected to the one or more client servers 111 and/or the one or more client databases 114, or may replace the one or more client servers 111 and/or the one or more client databases 114 in some embodiments. The computer system 120 may be a collection of cloud based servers and/or databases that includes its own DBMS and/or RDBMS.

Thus, embodiments of the invention include systems and methods of data masking that are incorporated into the functionality of local client servers and/or client databases, or systems and methods of data masking that are incorporated into the functionality of cloud based data services. The one or more client servers 111 and/or databases 114 may include the functionality described herein below with respect to the computer system 120. The one or more client servers 111 and/or databases 114 may be configured with the functionality described by the computer system 120, including the module structure 130 thereof. It should be understood that the systems and methods of data masking described herein may be applicable in any database management system. The one or more client databases 114 and/or the one or more client servers 111 and/or the computer system 120 may include data governance strategy and data masking capabilities for helping to mask or protect private data.

The one or more client databases 114 and/or the one or more client servers 111 and/or the computer system 120 may include client databases that include one or more data indexes configured to improve the speed of data retrieval operations. The one or more data indexes may include any index architecture or indexing methods. For example, the one or more data indexes may be non-clustered indexes, clustered indexes, or the like. Data indexes maybe bitmap indexes, dense indexes, sparse indexes, reverse indexes, and may be implanted using a variety of data structures, such as self-balanced trees. Thus, the one or more client databases 114 and/or the one or more client servers 111 and/or the computer system 120 may include the capability of collecting data and storing such data in a self-balancing tree such as a self-balancing binary search tree, a height-balanced binary search tree or the like. Self-balancing tree structures may include, for example, B-trees, B+-trees, Red and Black Trees, and the like. Any type of self-balancing tree structures for storing data is contemplated.

The network 107 may be any group of two or more computer systems linked together. The network 107 may represent, for example, the internet. The network 107 may be any type of computer network known by individuals skilled in the art. Examples of computer networks which may be embodied by the network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture. The computer system 120 is shown connected to one or more client users 110, the one or more client servers 111 and the one or more client databases 114 via the network 107. The network 107 may be a secure network protected by one or more firewalls to protect data transfer between the one or more client users 110, the one or more client servers 111 and/or the one or more client databases 114, and the computer system 120.

Embodiments of the computer system 120 may include a module structure 130 that includes a disabling module 131, a masking module 132, and an enabling module 133. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of module structure 130 may include one or more components of hardware and/or software program code for obtaining, retrieving, collecting, or otherwise receiving information or data from the one or more client users 110, the one or more client servers 111 and the one or more client databases 114. In an exemplary embodiment, the module structure 130 may be configured to receive information from the one or more client users 110, the one or more client servers 111 and/or the one or more client databases 114 related to data being stored by the client users 110. Embodiments of module structure 130 may further include one or more components of hardware and/or software program code for transmitting, sending, distributing or otherwise providing information or data to the one or more client users 110, the one or more client servers 111 and the one or more client databases 114. Data received by the module structure 130 for masking may include any type of domain or data, such as numbers, words, characters, or combinations thereof. The data may further include image data, video data, source code data, or any type of data desired to be masked by the module structure 130.

Embodiments of the disabling module 131 may include one or more components of hardware and/or software program code for disabling operation of a data structure that includes at least one data index. The disabling module 131 may be configured to determine when data masking is necessary based, for example, on a predetermined data masking rule structure. If data masking is necessary on a given data structure, the disabling module 131 may temporarily disable the data structure. Disabling may include preventing interaction with the data structure, preventing populating of a data structure, preventing balancing of a data structure, and/or preventing any modification of the data structure.

Embodiments of the masking module 132 may include one or more components of hardware and/or software program code for masking the data structure in a table with an isomorphic function. In one embodiment, the data index may include a plurality of nodes such that the masking module 132 may be configured to mask the data in each of the plurality of nodes with an isomorphic function. The isomorphic function may be an isomorphic function that preserves the relationship between the elements between the original and masked data. The isomorphic function may create masked data that is homomorphic and bijective relative to the original data. An isomorphic function, may for example, if the data structure is classified according to a sequential classification, shifting each element of the data structure by a predetermined amount within the sequential classification. For example, an isomorphic function may include adding a predetermined value to each of a set of numbers, such as $f(x)=x+2$.

One example of an isomorphic function may include determining a longest word in a set of words or alphanumeric strings. The isomorphic function may include appending random and/or predetermined characters to the set of words or alphanumeric strings, so that each of the masked words or alphanumeric strings is equal in length. The isomorphic function may further include adding one or more letters or alphanumeric characters beyond the maximum, so that the new maximum length for each of the masked words or alphanumeric strings is a predetermined number of letters or alphanumeric characters greater than the maximum length of the longest number or word or alphanumeric string in the original data. The appended letters or alphanumeric characters may be of a predetermined quality (i.e. all the letter a), or may be random. The resulting masked data (masked words or alphanumeric strings) may thus appear much larger than the original data set. To decode the above described masking, the computer system 120 may retain an understanding or knowledge of the length of each original word or alphanumeric string.

For example, if a set of words consists of: cat, cata, dog, and meerkat, the first step of masking with an isomorphic function may include determining the longest word and adding an "a" to the longest word. The masking with the isomorphic function may include adding an "a" to each word so that the word becomes an equal length to the longest word. The resulting dataset at this point would consist of: cataaaaa, cataaaaa, dogaaaaa, and meerkata. The next step of the masking with the isomorphic function may include appending the data with one or more random characters. This might make the masked dataset consist of: cataaaaaqwer, cataaaaaqwer, dogaaaaamnbgbhgjvjhvyfjhvjhv, and meerkataxax. In this example, cat and cata become the same word in order to maintain the isomorphic order to the data masking. The computer system 120 may store the original lengths of each word (3, 4, 3, 7, respectively), in order to use this information in decoding the data.

Another example of an isomorphic function may include masking numbers in a dataset. For example, in one example, the original dataset may consist of an integer, i.e. 2. Represented in binary as a small integer (i.e. 15 digits), this dataset would be represented as 000000000000010. The isomorphic function may first convert this small integer binary 2 to a big integer (32 digits) by adding 17 random digits to the dataset, as follows: 00000000000001001010011001001001. This same isomorphic function may be applied to a plurality of integers that comprise as data set. To decode the data, the computer system 120 may need to retain an understanding or knowledge of the original data type (i.e. the number of digits that were used to represent the number, in the above case the small integer, or 15 digits).

Using the isomorphic function, the masking module 132 may be configured to maintain an order between each of the plurality of nodes during the masking without deleting or reconstructing the at least one data index. The masking module 132 may be configured to mask the data in a self-balanced tree data structure such the masked data structure is preserved relative to the original data after self-balancing or updating of the self-balanced tree.

The computer system 120 is shown including both a data repository 126 and a masked data repository 127. The data repository 126 may be a data storage location within the computer system 120 that stores the original data prior to masking. The masked data repository 127 may be a repository, database, or the like that includes the data or information after it has been created and/or masked by the masking module 132. The data repositories 126, 127 may be configured to store any type of data including number data, word data, character data, or combinations thereof. The data repositories 126, 127 may be configured to store image data, video data, source code data, or any type of data desired to be masked by the module structure 130.

Embodiments of the enabling module 133 may include one or more components of hardware and/or software program code for enabling the operation of the data structure, and at least one data index thereof, once the masking is complete. The enabling module 133 may be configured to enable both the data in the original data repository 126 and in the masked data repository 127. Once the enabling module 133 enables the operation of the data structures, because the relationship is preserved between the original data and the masked data, changes such as self-balancing that occur may not require the deleting, reconstruction, or the like, of the masked data. Self-balancing may be applied to each of the original and masked data.

Referring still to FIG. 1, embodiments of the computer system 120 may be equipped with a memory device 142 which may store the information received by the computer system 120. The computer system 120 may further be equipped with a processor 141 for implementing the tasks associated with the system for data masking 100 and/or the computer system 120. While the computer system 120 is shown as a separate system relative to each of the one or more client users 110, the one or more client servers 111 and the one or more client databases 114, in some embodiments the functionality and module structure 130 of the computer system 120 may be integrated into the client database 114. Additionally or alternatively, the computer system 120 or module structure 130 thereof may be integrated into the systems encompassed by the network service providers 112 and content provider 113.

Figure 2:
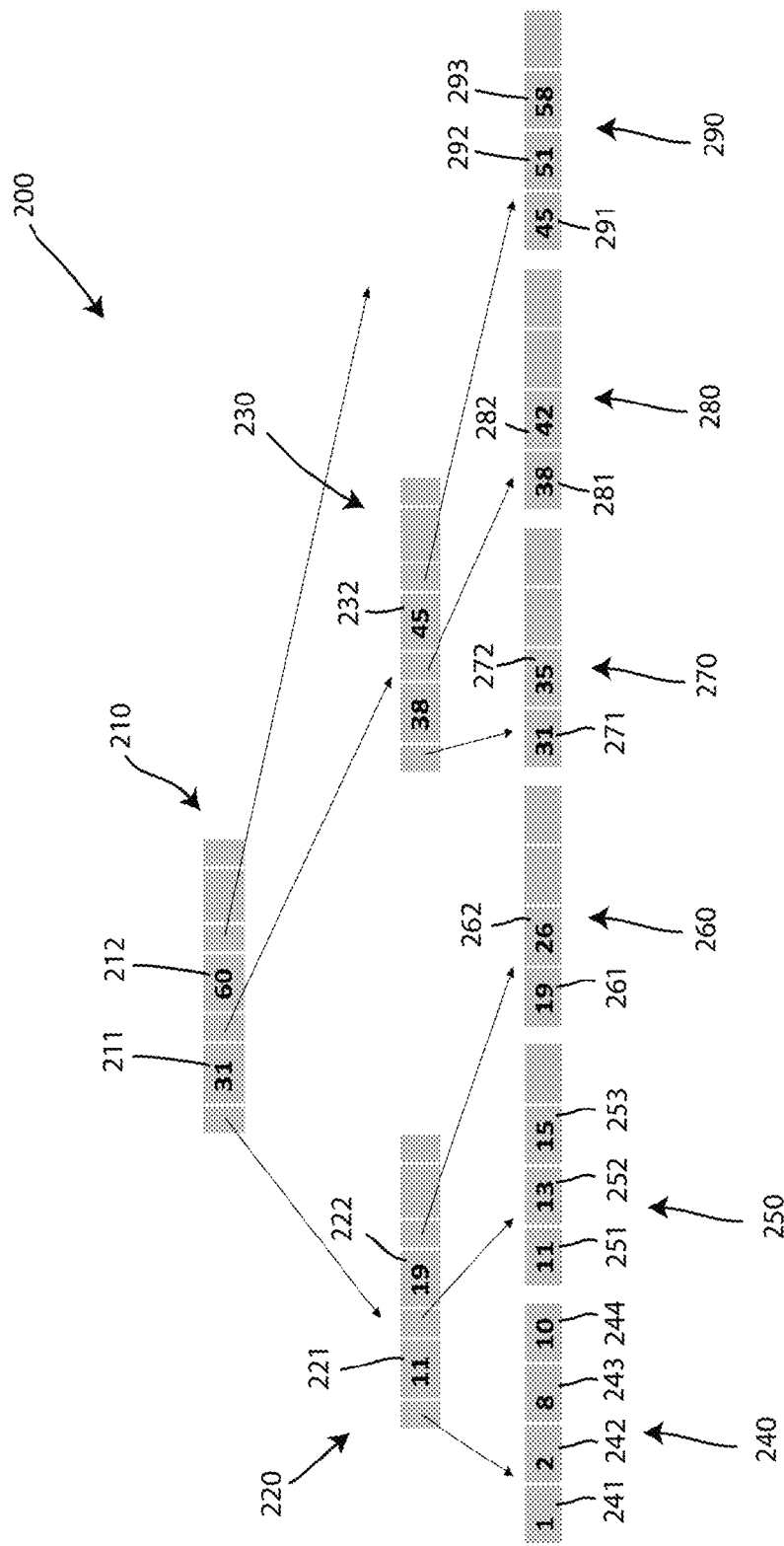
FIG. 2 depicts an original data structure with indexes in accordance with embodiments of the present invention.
Figure 3:
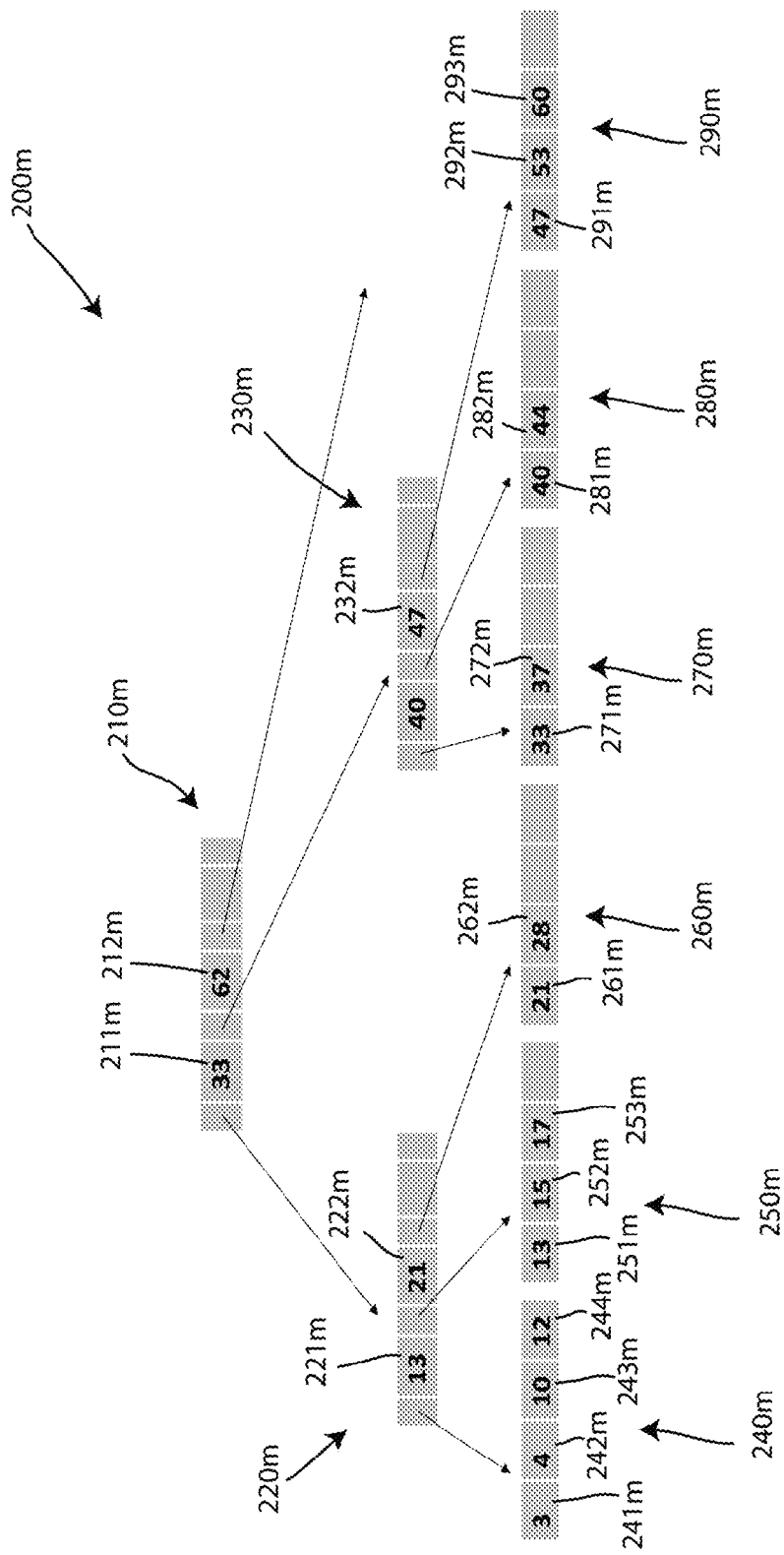
FIG. 3 depicts an exemplary isomorphic data masking function of the original data structure with indexes of FIG. 2 in accordance with embodiments of the present invention.

FIGS. 2-3 depict a first method of applying an isomorphic function to a numerical data set to perform data masking in accordance with the present invention. FIG. 2 depicts an original data structure with indexes in accordance with embodiments of the present invention. FIG. 3 depicts an exemplary isomorphic data masking function of the original data structure with indexes of FIG. 2 in accordance with embodiments of the present invention.

As shown in FIG. 2, a data structure 200 includes a root node 210, two branch nodes 220, 230, and six leaf nodes 240, 250, 260, 270, 280, 290. The data structure 200 may be a self-balancing tree structure with at data indexes. The root node 210 is shown to include a first root entry 211 and a second root entry 212. In the embodiment shown, the first root entry 211 is the numerical number 31 and the second root entry 212 is the numerical number 60. The first branch node 220 includes a first branch entry 221 that is the numerical number 11 and a second branch entry 222 that is the numerical number 19. The second branch node 230 includes a first branch entry 231 that is the numerical number 38 and a second branch entry 232 that is the numerical number 45. The first leaf node 240 includes a first leaf entry 241 that is the numerical number 1, a second leaf entry 242 that is the numerical number 2, a third leaf entry 243 that is the numerical number 8, and a fourth leaf entry 244 that is the numerical number 10. The second leaf node 250 includes a first leaf entry 251 that is the numerical number 11, a second leaf entry 252 that is the numerical number 13, a third leaf entry 253 that is the numerical number 15. The third leaf node 260 includes a first leaf entry 261 that is the numerical number 19 and a second leaf entry 262 that is the numerical number 26. The fourth leaf node 270 includes a first leaf entry 271 that is the numerical number 31 and a second leaf entry 272 that is the numerical number 35. The fifth leaf node 280 includes a first leaf entry 281 that is the numerical number 38 and a second leaf entry 282 that is the numerical number 42. The eighth leaf node 290 includes a first leaf entry 291 that is the numerical number 45, a second leaf entry 292 that is the numerical number 51 and a third leaf entry 293 that is the numerical number 58.

As shown in FIG. 3, an isomorphic function of $f(x)=x+2$ may be applied to each of the entries (x) in the original data set 200 to create a masked data set 200m. Thus, each of the entries may be masked in the masked data set 200m by the same isomorphic function (i.e. the addition of 2 to the original digit). Thus, the root node 210m is shown include a first root entry 211m that is the numerical number 33 (31+2) and a second root entry 212m that is the numerical number 62 (60+2). The first branch node 220m includes a first branch entry 221m that is the numerical number 13 (11+2) and a second branch entry 222m that is the numerical number 21 (19+2). The second branch node 230m includes a first branch entry 231m that is the numerical number 40 (38+2) and a second branch entry 232m that is the numerical number 47 (45+2). The first leaf node 240m includes a first leaf entry 241m that is the numerical number 3 (1+2), a second leaf entry 242m that is the numerical number 4 (2+2), a third leaf entry 243m that is the numerical number 10 (8+2), and a fourth leaf entry 244m that is the numerical number 12 (10+2). The second leaf node 250m includes a first leaf entry 251m that is the numerical number 13 (11+2), a second leaf entry 252m that is the numerical number 15 (13+2), a third leaf entry 253m that is the numerical number 17 (15+2). The third leaf node 260m includes a first leaf entry 261m that is the numerical number 21 (19+2) and a second leaf entry 262m that is the numerical number 28 (26+2). The fourth leaf node 270m includes a first leaf entry 271m that is the numerical number 33 (31+2) and a second leaf entry 272m that is the numerical number 37 (35+2). The fifth leaf node 280m includes a first leaf entry 281m that is the numerical number 40 (38+2) and a second leaf entry 282m that is the numerical number 44 (42+2). The eighth leaf node 290m includes a first leaf entry 291m that is the numerical number 47 (45+2), a second leaf entry 292m that is the numerical number 53 (51+2) and a third leaf entry 293m that is the numerical number 60 (58+2).

Figure 4:
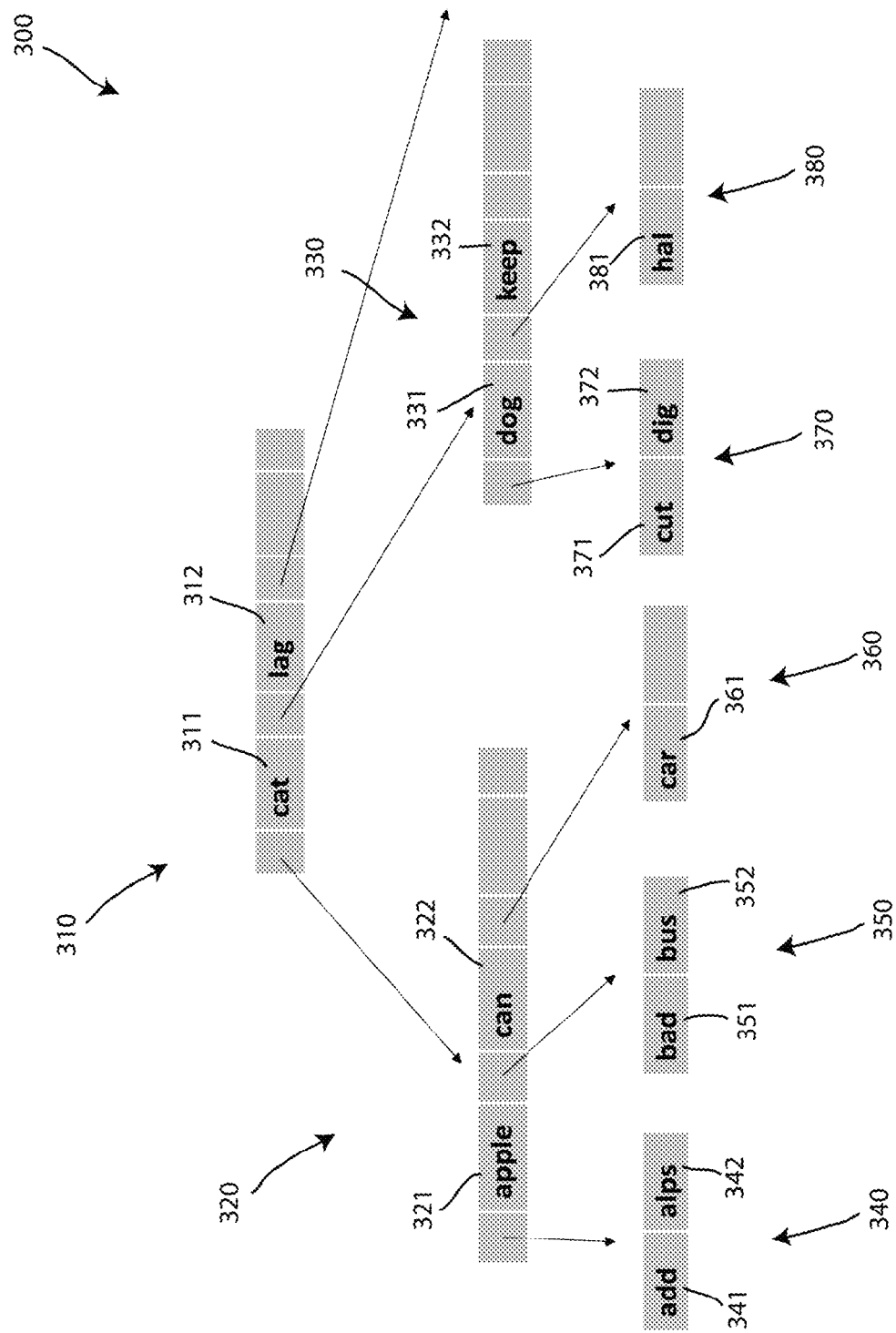
FIG. 4 depicts another exemplary isomorphic data masking function with indexes in accordance with embodiments of the present invention.
Figure 5:
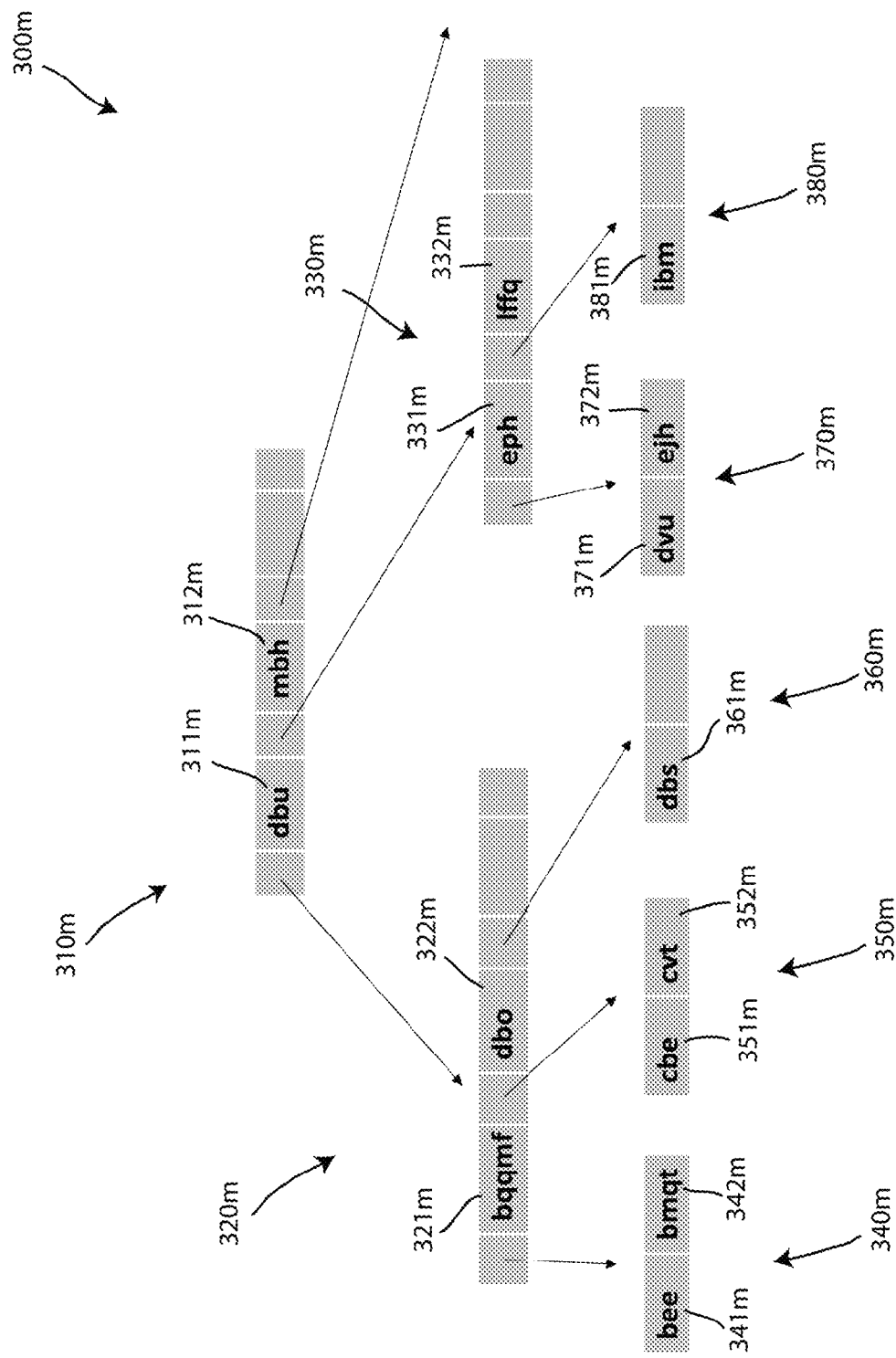
FIG. 5 depicts another exemplary isomorphic data masking function of the original data structure with indexes of FIG. 4 in accordance with embodiments of the present invention.

FIGS. 4-5 depict a first method of applying an isomorphic function to perform data masking of a data set of words in accordance with the present invention. FIG. 4 depicts another exemplary isomorphic data masking function with indexes in accordance with embodiments of the present invention. FIG. 5 depicts another exemplary isomorphic data masking function of the original data structure with indexes of FIG. 4 in accordance with embodiments of the present invention.

As shown in FIG. 4, a data structure 300 includes a root node 310, two branch nodes 320, 330, and five leaf nodes 340, 350, 360, 370, 380. The data structure 300 may be a self-balancing tree structure with at data indexes. The root node 310 is shown to include a first root entry 311 and a second root entry 312. In the embodiment shown, the first root entry 311 is the word "cat" and the second root entry 312 is the word "lag". The first branch node 320 includes a first branch entry 321 that is the word "apple" and a second branch entry 322 that is the word "can". The second branch node 330 includes a first branch entry 331 that is the word "dog" and a second branch entry 332 that is the word "keep". The first leaf node 340 includes a first leaf entry 341 that is the word "add", and a second leaf entry 342 that is the word "alps". The second leaf node 350 includes a first leaf entry 351 that is the word "bad", and a second leaf entry 352 that is the word ""bus". The third leaf node 360 includes a first leaf entry 361 that is the word "car." The fourth leaf node 370 includes a first leaf entry 371 that is the word "cut" and a second leaf entry 372 that is the word "dig". The fifth leaf node 380 includes a first leaf entry 381 that is the word "hal."

As shown in FIG. 5, an isomorphic function may be applied to each of the entries in the original data set 300 to create a masked data set 300m. In this example, the isomorphic function shifts the data to the right by a single character on a predetermined scale. In the case of this example, the predetermined scale may be the alphabet. Thus, each of the entries may be masked in the masked data set 300m by the same isomorphic function (i.e. the movement to the right by one on the alphabetic sequence. Thus, the root node 310m is shown include a first root entry 311m that is the letters "dbu" (shifted from "cat") and a second root entry 312m that is the letters "mbh" (shifted from "lag"). The first branch node 320m includes a first branch entry 321m that is the letters "bqqmf" (shifted from "apple") and a second branch entry 322m that is the letters "dbo" (shifted from "can"). The second branch node 330m includes a first branch entry 331m that is the letters "eph" (shifted from "dog") and a second branch entry 332m that is the letters "lffq" (shifted from "keep"). The first leaf node 340m includes a first leaf entry 341m that is the letters "bee" (shifted from "add") and a second leaf entry 342m that is the letters "bmqt" (shifted from "alps"). The second leaf node 350m includes a first leaf entry 351m that is the letters "cbe" (shifted from "bad") and a second leaf entry 352m that is the letters "cvt" (shifted from "bus"). The third leaf node 360m includes a first leaf entry 361m that is the letters "dbs" (shifted from "car"). The fourth leaf node 370m includes a first leaf entry 371m that is the letters "dvu" (shifted from "cut") and a second leaf entry 372m that is the letters "ejh" (shifted from "dig"). The fifth leaf node 380m includes a first leaf entry 381m that is the letters "ibm" (shifted from "hal").

Figure 6:
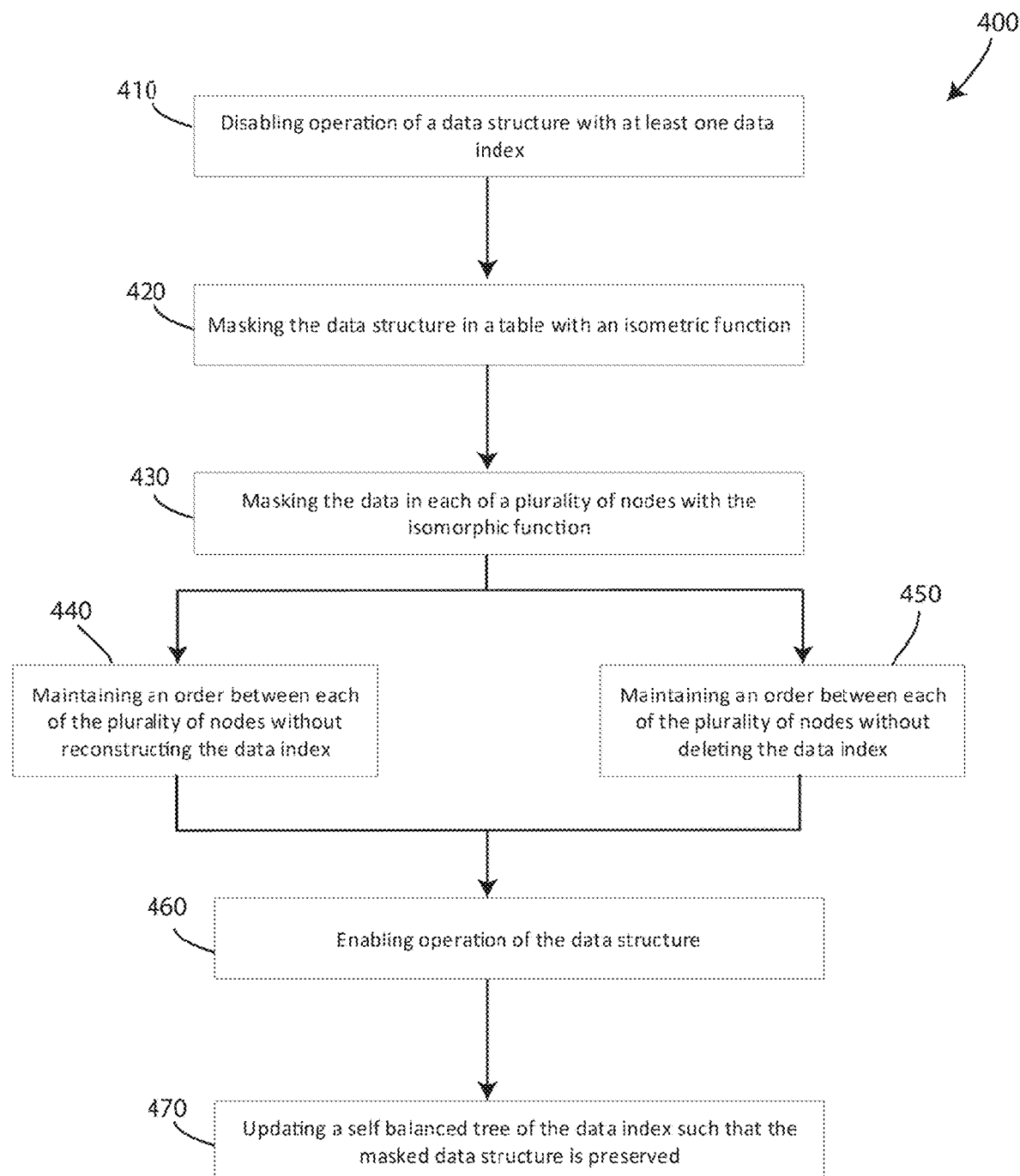
FIG. 6 depicts a flow chart of a method for managing downloading of content, in accordance with embodiments of the present invention.

FIG. 6 depicts a flow chart of a method for managing downloading of content 400, in accordance with embodiments of the present invention. The method 400 may include a step 410 of disabling, by one or more processors of a computer system such as the computer system 120 or one or both of the client servers 111 and the client databases 114, operation of a data structure, such as the data structures 200, 300 that includes at least one data index. The method 400 may include a step 420 of masking, by the one or more processors of the computer system, the data structure in a table with an isomorphic function. The method 400 may include a step 430 of masking, by the one or more processors of the computer system, the data in each of a plurality of nodes with the isomorphic function. The method 400 may include a step 440 of maintaining, by the one or more processors of the computer system, an order between each of the plurality of nodes during the masking without deleting the at least one data index. The method 400 may include a step 450 of maintaining, by the one or more processors of the computer system, an order between each of the plurality of nodes during the masking without reconstructing the at least one data index. The method 400 may then include a step 460 of enabling, by the one or more processors of the computer system, operation of the data structure. Step 460 may further include enabling operation of the masked data structure. The method 400 may include a step 470 of updating, by the one or more processors of the computer system, the self-balancing tree of the at least one data index such that the masked data structure is preserved.

Figure 7:
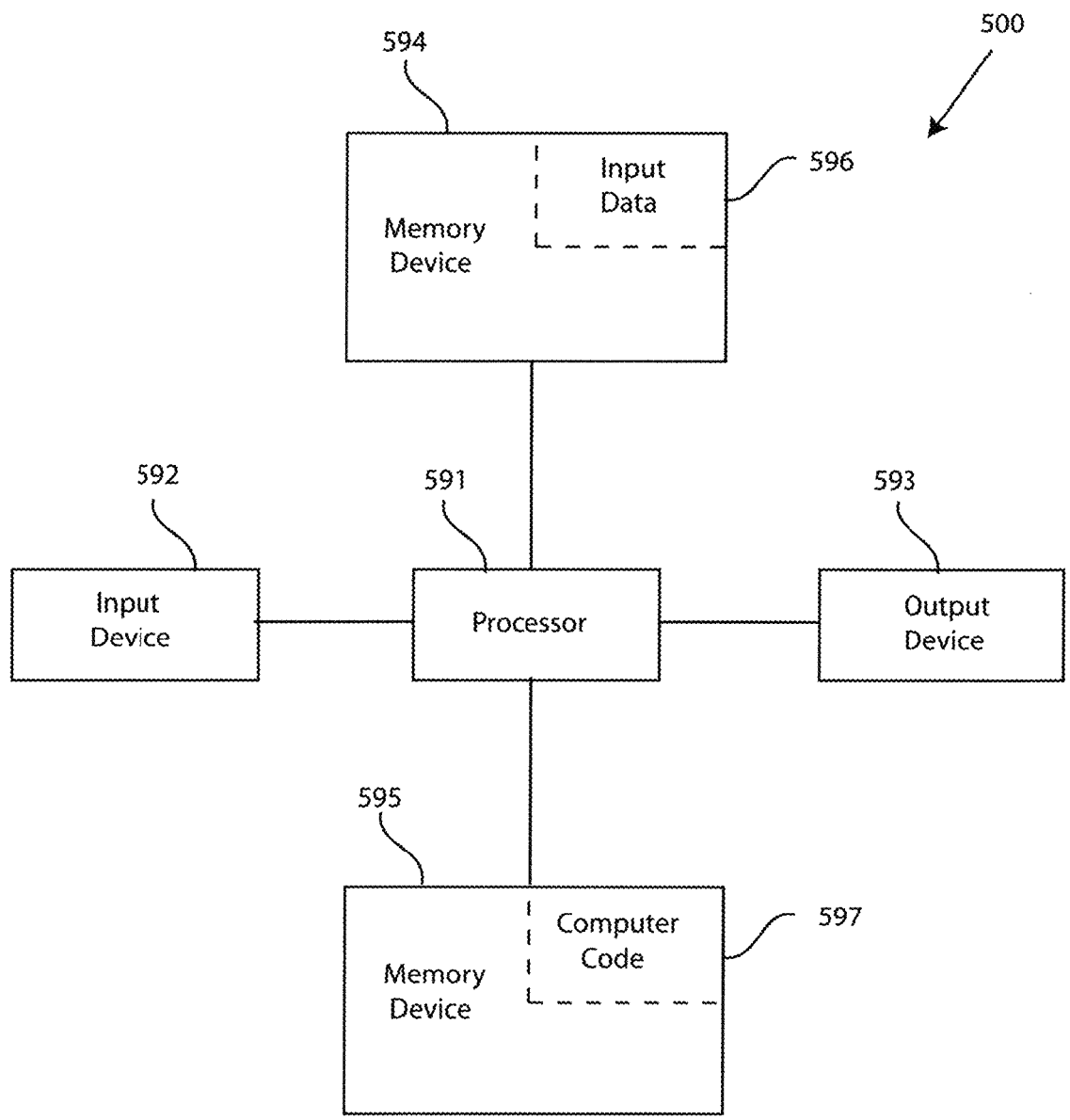
FIG. 7 depicts a block diagram of a computer system of the system for masking data of FIG. 1, capable of implementing methods for masking data of FIGS. 2-5, in accordance with embodiments of the present invention.

FIG. 7 illustrates a block diagram of a computer system that may representative of any computer or computer system within the system for masking data of FIG. 1, capable of implementing methods for masking data of FIGS. 2-6, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for masking data, in the manner prescribed by the embodiments of FIGS. 2-6 using the system for masking data of FIG. 1, wherein the instructions of the computer code 597 may be executed by processor 591 via memory device 595. The computer code 597 may include software or program instructions that may implement one or more algorithms for implementing the methods for masking data, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 7.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods for masking data. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide a system for masking data. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for masking data. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for masking data.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
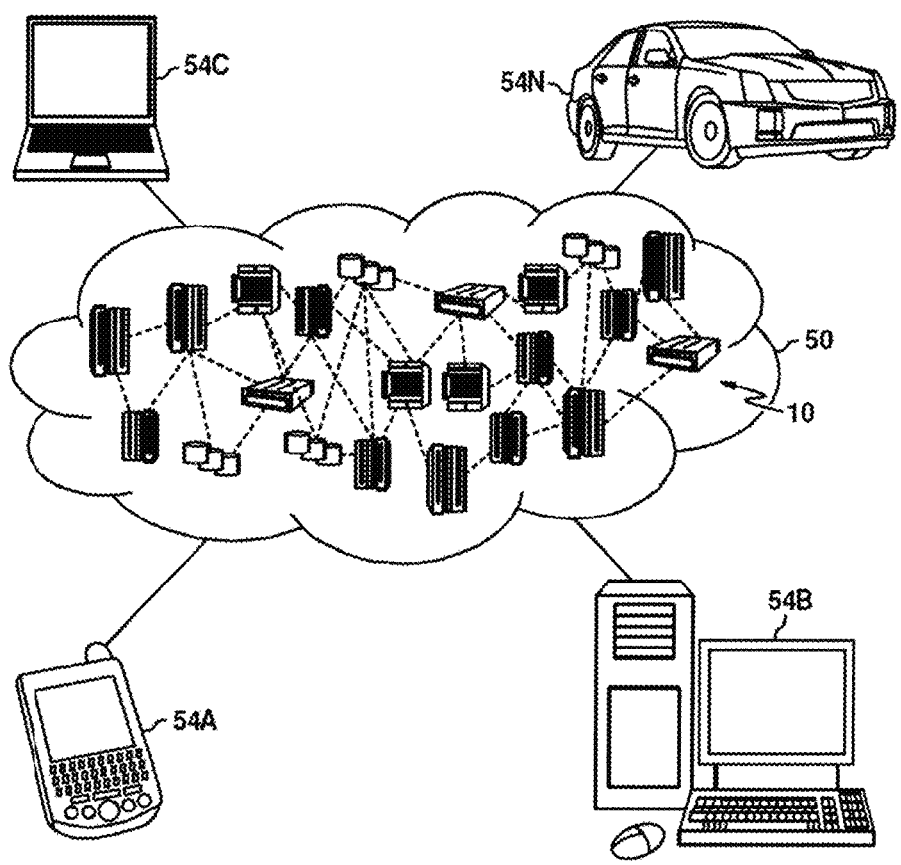
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
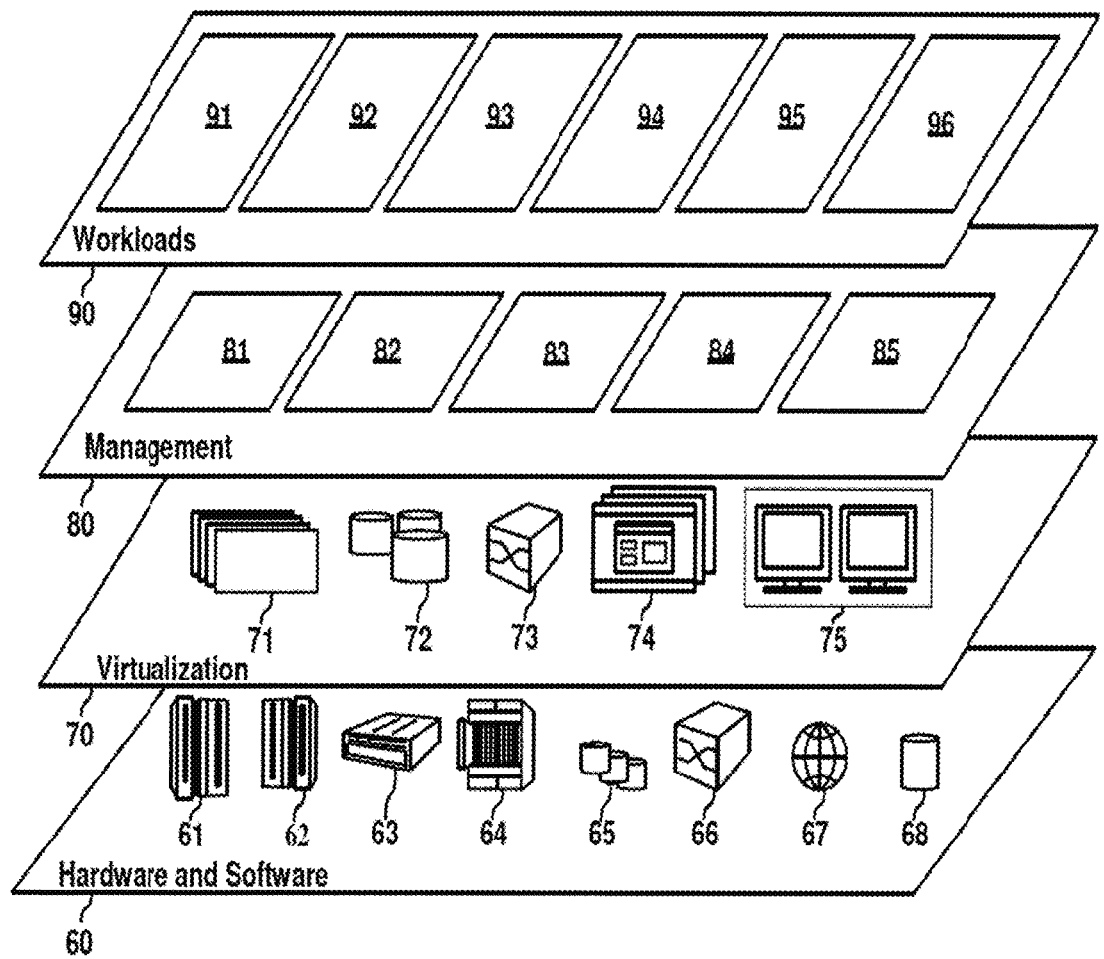
FIG. 9 depicts abstraction model layers, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing related to masking data 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of masking data, the method comprising:
    disabling, by one or more processors of a computer system, a data structure that includes at least one data index, wherein the at least one data, index is a self-balancing tree;
    masking, by the one or more processors of the computer system, the data structure in a table with an isomorphic function;
    enabling, by the one or more processors of the computer system, the data structure; and
    updating, by the one or more processors of the computer system, the self-balancing tree of the at least one data index such that the masked data structure relationships are preserved and preserving the relationships, by the one or more processors of the computer system, between the masked data and the original data by not requiring at least one of the deletion and reconstruction of the at least one data index.

2. The method of claim 1, wherein the data index includes a plurality of nodes and wherein the masking further includes:

masking, by the one or more processors of the computer system, data in each of the plurality of nodes with the isomorphic function.

3. The method of claim 2, the method further comprising: maintaining, by the one or more processors of the computer system, an order between each of the plurality of nodes during the masking without deleting the at least one data index.

4. The method of claim 2, the method further comprising: maintaining, by the one or more processors of the computer system, an order between each of the plurality of nodes during the masking without reconstructing the at least one data index.

5. The method of claim 1, further comprising:
appending, by the one or more processors of the computer system, characters to an alphanumeric string within the at least one data index during the masking so that each alphanumeric string in the at least one data index is equal in length; and
adding, by the one or more processors of the computer system, one or more characters to each set of alphanumeric strings of the at least one data index during the masking.

6. The method of claim 1, wherein each element of the data structure is classified according to a sequential classification, and wherein the isomorphic function includes shifting each element of the data structure by a predetermined amount on the sequential classification.

7. A computer system, comprising: one or more processors; one or more memory devices coupled to the one or more processors; and one or more computer readable storage devices coupled to the one or more processors, wherein the one or more storage devices contain program code executable by the one or more processors via the one or more memory devices to implement a method of masking data, the method comprising:
disabling, by, one or more processors of a computer system, a data structure that includes at least one data index, wherein the at least one data index is a self-balancing tree;
masking, by the one or more processors of the computer system, the data structure in a table with an isomorphic function;
enabling, by the one or more processors of the computer system, the data structure;
updating, by the one or more processors of the computer system, the self-balancing tree of the at least one data index such that the masked data structure relationships are preserved; and
preserving the relationships, by the one or more processors of the computer system, between the masked data and the original data by not requiring at least one of the deletion and reconstruction of the at least one data index.

8. The computer system of claim 7, wherein the data index includes a plurality of nodes and wherein the masking further includes:
masking, by the one or more processors of the computer system, data in each of the plurality of nodes with the isomorphic function.

9. The computer system of claim 8, the method further comprising:
maintaining, by the one or more processors of the computer system, an order between each of the plurality of nodes during the masking without deleting the at least one data index.

10. The computer system of claim 8, the method further comprising:
maintaining, by the one or more processors of the computer system, an order between each of the plurality of nodes during the masking without reconstructing the at least one data index.

11. The computer system of claim 7, the method further comprising:
appending, by the one or more processors of the computer system, characters to an alphanumeric string within the at least one data index during the masking so that each alphanumeric string in the at least one data index is equal in length; and
adding, by the one or more processors of the computer system, one or more characters to each set of alphanumeric strings of the at least one data index during the masking.

12. The computer system of claim 7, the method further comprising:
wherein each element of the data structure is classified according to a sequential classification, and wherein the isomorphic function includes shifting each element of the data structure by a predetermined amount on the sequential classification.

13. A computer program product, comprising a computer readable hardware storage device storing a computer readable program code, the computer readable program code comprising an algorithm that when executed by one or more processors of a computer system implements a method of masking data, the method comprising:
disabling, by one or more processors of a computer system, a data structure that includes at least one data index, wherein the at least one data index is a self-balancing tree;
masking, by the one or more processors of the computer system, the data structure in a table with an isomorphic function;
enabling, by the one or more processors of the computer system, the data structure;
updating, by the one or more processors of the computer system, the self-balancing tree of the at least one data index such that the masked data structure relationships are preserved; and
preserving the relationships, by the one or more processors of the computer system, between the masked data and the original data by not requiring at least one of the deletion and reconstruction of the at least one data index.

14. The computer program product of claim 13, wherein the data index includes a plurality of nodes and wherein the masking further includes:
masking, by the one or more processors of the computer system, data in each of the plurality of nodes with the isomorphic function.

15. The computer program product of claim 14, the method further comprising:
maintaining, by the one or more processors of the computer system an order between each of the plurality of nodes during the masking without deleting the at least one data index.

16. The computer program product of claim 14, the method further comprising:
maintaining, by the one or more processors of the computer system an order between each of the plurality of nodes during the masking without reconstructing the at least one data index.

17. The computer program product of claim 13, the method further comprising:
- appending, by the one or more processors of the computer system, characters to an alphanumeric string within the at least one data index during the masking so that each alphanumeric string in the at least one data index is equal in length; and
- adding, by the one or more processors of the computer system, one or more characters to each set of alphanumeric strings of the at least one data index during the masking.

18. The computer program product of claim 13, the method further comprising:
- wherein each element of the data structure is classified according to a sequential classification, and wherein the isomorphic function includes shifting each element of the data structure by a predetermined amount on the sequential classification.

\* \* \* \* \*